H. A. WALKER.
Cotton-Seed Planter.
No. 211,197. Patented Jan. 7, 1879.
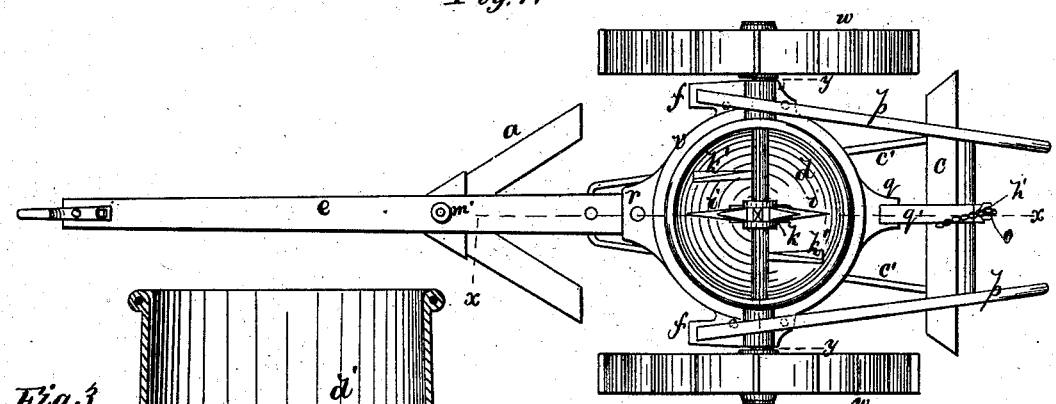
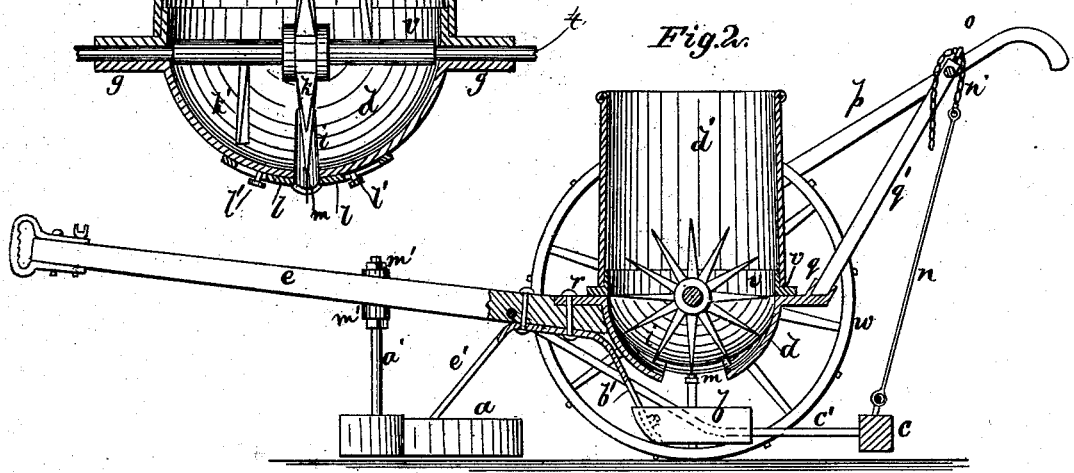
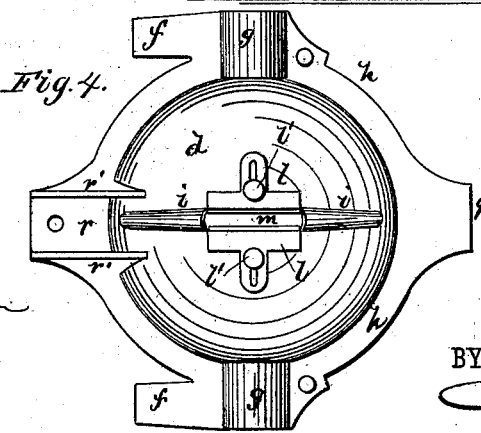
WITNESSES:
Henry N. Miller
C. Sedgwick
INVENTOR:
H. A. Walker
BY Munn & Co.
ATTORNEYS.

UNITED STATES PATENT OFFICE.

HENRY A. WALKER, OF MILTON, ASSIGNOR TO GEORGE HOWARD, OF TARBOROUGH, NORTH CAROLINA.

IMPROVEMENT IN COTTON-SEED PLANTERS.

Specification forming part of Letters Patent No. 211,197, dated January 7, 1879; application filed October 15, 1878.

*To all whom it may concern:*

Be it known that I, HENRY A. WALKER, of Milton, in the county of Caswell and State of North Carolina, have invented a new and Improved Cotton-Seed Planter, of which the following is a specification:

My invention relates to machines for planting cotton and other seed, and to the construction and arrangement of the parts of the apparatus, whereby the machine is rendered substantial and effective in operation.

The leveler, opener, and coverer are all attached directly to the beam, so that no damage is done to the main body of the apparatus in case any of the parts named come in contact with a stone. The seed-box, lugs for connection of the handles and beam, and boxes for the shaft are in one casting, and so shaped as to give great strength, and the seed-box is of semi-spherical form, so that the seed gravitates naturally to the discharge-opening. The machine has other advantageous details of construction, as hereinafter described.

In the accompanying drawing, Figure 1 is a plan of my planter. Fig. 2 is a sectional elevation on line $xx$. Fig. 3 is a cross-section of the seed-box, and Fig. 4 is an inverted plan of the seed-box.

Similar letters of reference indicate corresponding parts.

The leveler $a$ is upon the lower end of a rod, $a'$, that passes through the beam $e$, and is held in position firmly and adjustably by nuts $m'$ at the upper and under side of beam $e$. A rod, $e'$, from the beam $e$ serves to brace leveler $a$ and prevent it bending backward. The opener $b$ is at the lower end of a rod, $b'$, which is attached rigidly to beam $e$, and to permit adjustment of opener $b$, so that it will open a furrow more or less deep, the rod $b'$ enters in the space between the inclined sides of $b$, and is connected thereto by a screw-bolt, which passes through a slot in $b'$, and a clamping-nut.

The coverer $c$ is at the end of rods $c'$, which extend forward and are hung in beam $e$, to permit the coverer to rest on the ground by its weight. The coverer $c$ can be raised by means of the rod $n$ and chain $n'$, and held at the desired height by the forked catch $o$ on the brace $q'$, over which the chain $n'$ is to be hooked, as shown.

The seed-box $d$ is of cast-iron, of semi-spherical form, and is cast with a rim, $h$, lugs and sockets $f$ for handles $p$, lug $r$ for connection of beam $e$, boxes $g$ for the axle $t$, and lug and socket $q$ for the handle-brace $q'$. The lug $r$ has side projections, $r'$, between which the beam $e$ is entered, and a bolt, $u$, holds the beam in place.

A flanged ring, $v$, corresponding in diameter to rim $h$, and formed with upper boxes for axle $t$, is bolted upon rim $h$, and carries the sheet-metal hopper $d'$ of seed-box $d$. The wheels $w$ are on the outer ends of axle $t$ and support the apparatus. The seed-box $d$ has a narrow slit or opening, $m$, at the bottom, that may be closed more or less by slides $l$, which are clamped in position upon the under side of $d$ by thumb-screws $l'$.

$i\ i$ are grooves at the inner side of box $d$, forming a continuation of slot $m$ at each end, the bottom of said grooves $i$ being in the arc of a circle from the center of axle $t$ and below the surface of slides $l$. Upon the axle $t$, at the center of box $d$, is fixed a hub having radiating fingers $k$, which are long enough to project into the grooves $i$ and slit $m$ as the axle revolves. $k'$ are stirrers on axle $t$, for the purpose of keeping the seeds stirred and insuring their proper distribution. The size and shape of the parts is such that while the ends of fingers $k$ pass into slit $m$ and below the slides $l$, they do not come sufficiently near the upper rim of the seed-box $d$ to crush the seed or wear out the hopper by forcing seed against it. The seeds fall into the slot $i$ in front of slides $l$, and are pushed out by fingers $k$, in front of the slides $l$, and not between the slides, so that the slides $l$ can be set very closely together and the feed accurately adjusted. Only a definite number of seeds can pass out at once, and the feed may be reduced to a small limit. The fingers $k$ pass through between slides $l$ the whole length of slot $m$, and the opening for the seed therefore cannot become choked, as is common with flat-bottom machines.

It will be seen that by the construction described no work is required of the parts of the machine that are back of the beam, except to stir the seed and feed them. The parts subject to strain or shock are directly connected to the beam, and do not affect the main body. The construction described also facilitates replacement of broken parts, besides furnishing a compact and substantial machine.

Having thus described my invention, I claim as new and desire to secure by Letters Patent—

1. The seed-box $d$, having the slit $m$ and grooves $i$, in combination with a hub having fingers arranged to work in said slit and grooves, as and for the purpose specified.

2. The seed-box $d$, cast in one piece, with the lugs and sockets $r\ f$, and boxes $g$, and rim $h$, for the attachment of the beam, handles, and shaft, substantially as and for the purposes described.

HENRY A. WALKER.

Witnesses:
F. L. WALKER,
R. L. WALKER.